United States Patent
Laselva et al.

(10) Patent No.: US 11,184,784 B2
(45) Date of Patent: Nov. 23, 2021

(54) METHOD OF UE AUTONOMOUS MEASUREMENT RELATED ACTIONS UPON IMPLICIT TRIGGERS

(71) Applicant: Nokia Technologies Oy, Espoo (FI)

(72) Inventors: Daniela Laselva, Klarup (DK); Frank Frederiksen, Klarup (DK)

(73) Assignee: Nokia Technologies Oy, Espoo (FI)

( * ) Notice: Subject to any disclaimer, the term of this patent is extended or adjusted under 35 U.S.C. 154(b) by 49 days.

(21) Appl. No.: 15/762,609

(22) PCT Filed: Aug. 31, 2016

(86) PCT No.: PCT/FI2016/050599
§ 371 (c)(1),
(2) Date: Mar. 23, 2018

(87) PCT Pub. No.: WO2017/051067
PCT Pub. Date: Mar. 30, 2017

(65) Prior Publication Data
US 2018/0288637 A1    Oct. 4, 2018

Related U.S. Application Data

(60) Provisional application No. 62/222,805, filed on Sep. 24, 2015.

(51) Int. Cl.
*H04W 24/08* (2009.01)
*H04W 16/18* (2009.01)
(Continued)

(52) U.S. Cl.
CPC ........... *H04W 24/08* (2013.01); *H04W 16/18* (2013.01); *H04W 24/10* (2013.01); *H04W 36/14* (2013.01);
(Continued)

(58) Field of Classification Search
CPC ..... H04W 80/04; H04W 84/12; H04W 88/06; H04W 88/08; H04W 84/18; H04W 16/18;
(Continued)

(56) References Cited

U.S. PATENT DOCUMENTS 7,082,604 B2 * 7/2006 Schneiderman ...... G06F 9/4862
709/202
7,120,431 B1 * 10/2006 Huo ...................... H04W 16/28
455/423
(Continued)

FOREIGN PATENT DOCUMENTS

CN    103843400 A    6/2014
CN    104469856 A    3/2015
(Continued)

OTHER PUBLICATIONS

3GPP TSG RAN Meeting #67, Shanghai, China, Mar. 9-12, 2015, RP-150510, "New WI Proposal: LTE-WLAN Radio Level Integration and Interworking Enhancement", Intel Corporation, China Telecom, Qualcomm Inc., 8 pgs.
(Continued)

*Primary Examiner* — Hassan A Phillips
*Assistant Examiner* — Prenell P Jones
(74) *Attorney, Agent, or Firm* — Harrington & Smith (57) ABSTRACT

Embodiment of the invention include a process of receiving an indication from a first wireless network to configure a user equipment to enter a first operating mode, wherein the first operating mode comprises performing measurements according to a first time pattern for at least one second wireless network signal to detect at least one second wireless network; determining whether the user equipment is stationary; and identifying, at the user equipment, a first condition from at least the measurements performed according to the first time pattern which triggers the user equipment to
(Continued)

autonomously enter a second operating mode while the user equipment is determined to be stationary.

18 Claims, 3 Drawing Sheets

(51) Int. Cl.
    *H04W 36/30*      (2009.01)
    *H04W 36/14*      (2009.01)
    *H04W 24/10*      (2009.01)
    *H04W 76/28*      (2018.01)
    *H04W 88/06*      (2009.01)
    *H04W 84/04*      (2009.01)
    *H04W 84/12*      (2009.01)

(52) U.S. Cl.
    CPC ........... *H04W 36/30* (2013.01); *H04W 76/28* (2018.02); *H04W 84/042* (2013.01); *H04W 84/12* (2013.01); *H04W 88/06* (2013.01)

(58) Field of Classification Search
    CPC ..... H04W 24/08; H04W 36/30; H04W 36/14; H04W 24/10; H04W 76/28; H04W 84/042
    See application file for complete search history.

(56) References Cited

U.S. PATENT DOCUMENTS

| | | | | |
|---|---|---|---|---|
| 9,042,918 B2* | 5/2015 | Teyeb | ................... | H04W 4/023 455/456.6 |
| 9,554,315 B2* | 1/2017 | Burbidge | ........... | H04W 36/0022 |
| 9,736,735 B2* | 8/2017 | Jung | ..................... | H04W 24/10 |
| 10,341,910 B2* | 7/2019 | Burbidge | .......... | H04W 36/0066 |
| 2005/0159147 A1* | 7/2005 | Roberts | ................. | H04W 24/00 455/423 |
| 2006/0293061 A1* | 12/2006 | Kobayashi | .............. | H04L 45/02 455/455 |
| 2012/0231858 A1* | 9/2012 | Hebbar | ............. | H04W 52/0251 455/574 |
| 2012/0289221 A1* | 11/2012 | Huber | ................. | G06Q 20/1235 455/422.1 |
| 2013/0053091 A1* | 2/2013 | Jorguseski | ............. | H04W 24/02 455/524 |
| 2013/0084856 A1 | 4/2013 | Prasad et al. | .................. | 455/434 |
| 2013/0201884 A1* | 8/2013 | Freda | ................. | H04W 74/0833 370/278 |
| 2014/0056243 A1 | 2/2014 | Pelletier et al. | .............. | 370/329 |
| 2014/0254579 A1* | 9/2014 | Huber | ................. | G06Q 20/1235 370/338 |
| 2015/0050934 A1 | 2/2015 | Jung et al. | ..................... | 455/437 |
| 2015/0078153 A1 | 3/2015 | Kuo et al. | ..................... | 370/230 |
| 2015/0094102 A1 | 4/2015 | Jung et al. | ................. | 455/456.6 |
| 2015/0124748 A1* | 5/2015 | Park | ...................... | H04L 5/0032 370/329 |
| 2015/0215839 A1 | 7/2015 | Johansson et al. | | |
| 2015/0326377 A1* | 11/2015 | Freda | .................... | H04W 16/14 370/278 |
| 2015/0358866 A1* | 12/2015 | Xu | ........................ | H04W 68/00 370/331 |
| 2016/0007237 A1* | 1/2016 | Jung | ................... | H04L 41/0816 455/438 |
| 2016/0080131 A1* | 3/2016 | Terry | ...................... | H04L 5/001 370/311 |
| 2017/0366960 A1* | 12/2017 | Kim | ...................... | H04W 76/22 |
| 2018/0184270 A1* | 6/2018 | Chun | .................... | H04W 76/14 |

FOREIGN PATENT DOCUMENTS

CN      104584633 A      4/2015
WO     WO 2013/114155 A1    8/2013

OTHER PUBLICATIONS

Mathias, Craig, "A guide to Wi-Fi power-save technologies", Farpoint Group, Techworld.com, May 13, 2010, 2 pgs.

* cited by examiner

METHOD OF UE AUTONOMOUS MEASUREMENT RELATED ACTIONS UPON IMPLICIT TRIGGERS

CROSS-REFERENCE TO RELATED APPLICATIONS

This application was originally filed as Patent Cooperation Treaty Application No. PCT/FI2016/050599 filed on 31 Aug. 2016 which claims the benefit of U.S. Provisional Application No. 62/222,805 filed on 24 Sep. 2015, the disclosures of which are incorporated herein by reference in their entireties.

TECHNICAL FIELD

This invention relates generally to wireless networks and, more specifically, relates to User Equipment (UE) measurements in cellular and wireless networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Cellular networks face substantial challenges to keep up with the constantly increasing capacity demand of users. One way cellular networks are trying to meet the demand is by utilizing smaller networks, such as wireless local area networks (WLAN), to offload some of the traffic. However, effectively integrating smaller networks with cellular networks also presents challenges. For example, user equipments additional power usage may be required to utilize the WLANs.

Abbreviations that may be found in the specification and/or the drawing figures are defined below, after the detailed description section:

3GPP third generation partnership project
ANDSF access network detection and selection function
AP (WLAN) access point
eNB enhanced node B (LTE base station)
EPS Evolved Packet System
ID identifier
IW interworking
LTE long term evolution (4g)
LWA LTE-WLAN Aggregation
MO Mobile Originating
RAN radio access network
RRC Radio Resource Control
RSSI Received Signal Strength Indicator
UE user equipment
WLAN wireless local area network

BRIEF DESCRIPTION OF THE DRAWINGS

These and other features, aspects, and advantages of the present invention will become better understood with regard to the following description, appended claims, and accompanying drawings, where:

DETAILED DESCRIPTION

The exemplary embodiments herein describe techniques for user equipment autonomous measurement related actions upon implicit triggers. Additional description of these techniques is presented after a system into which the exemplary embodiments may be used is described.

Figure 1:
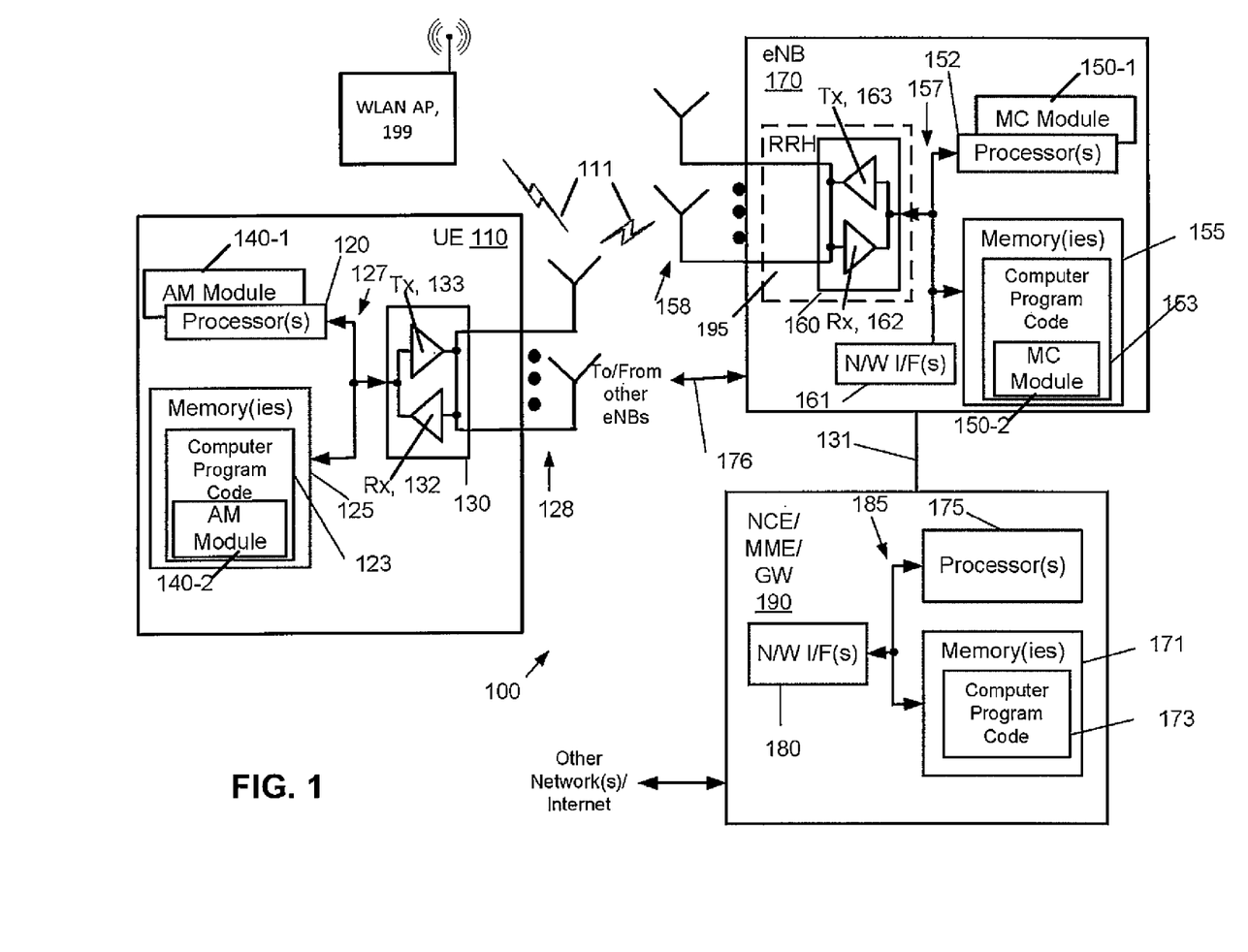
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a UE 110 is in wireless communication with a wireless network 100. The user equipment 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more transceivers 130 may include a WLAN transceiver for connecting to a WLAN AP 199. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes an Autonomous Measurement (AM) module 140, comprising one of or both parts 140-1 and/or 140-2, which may be implemented in a number of ways. The Autonomous Measurement module 140 may be implemented in hardware as Autonomous Measurement part 140-1, such as being implemented as part of the one or more processors 120. The Autonomous Measurement part 140-1 may be implemented also as an integrated circuit or through other hardware such as a programmable gate array. In another example, the Autonomous Measurement module 140 may be implemented as Autonomous Measurement part 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB 170 is a base station that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes a Measurement Configuration (MC) module 150, comprising one of or both parts 150-1 and/or 150-2, which may be implemented in a number of ways. The Measurement Configuration module 150 may be implemented in hardware as Measurement Configuration part 150-1, such as being implemented as part of the one or more processors 152. The Measurement Configuration part 150-1 may be implemented also as an integrated circuit or through other hardware such as a programmable gate array. In another example, the Measurement Configuration module 150 may be implemented as Measurement Configuration part 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

The wireless network 100 may include a network control element (NCE) 190 that may include MME/SGW functionality, and which provides connectivity with a further network, such as a telephone network and/or a data communications network (e.g., the Internet). The eNB 170 is coupled via a link 131 to the NCE 190. The link 131 may be implemented as, e.g., an Si interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments of the invention may be related to the area of LTE-WLAN radio interworking and aggregation. The Third Generation Partnership Project (3GPP) has recently approved Rel-13 Work Item (WI) "LTE-WLAN Radio Level Integration and Interworking Enhancement" (RP-150510) at the RAN Plenary #67, during March 2015. RP-150510 discusses Radio Level Integration, and leverages LTE dual connectivity (DC) bearer split functionality (a.k.a. option 3C) currently under standardization in 3GPP. This functionality is referred to as LTE-WLAN Aggregation (Rel-13 LWA). RP-150510 includes enhancements to the Rel-12 WLAN radio interworking functionality which adds further control to the 3GPP RAN over RRC_CONNECTED UEs, including the support of a dedicated traffic steering command to instruct traffic offloading/onloading based on UE measurement reporting. The Rel-13 WLAN interworking enhancements (Rel-13 LWI) are meant to enhance the Rel-12 WLAN radio interworking functionality which enables the UE to determine offloading/onloading traffic based on given rules, e.g. RAN rules/eANDSF rules and RAN provided thresholds. For example, a UE may offload traffic to WLAN if Received Signal Strength Indicator (RSSI) is greater than some threshold. Rel-12 LWI capability seems reasonable to assume at least for Rel-13 LWI-capable UEs, at least RAN rules could be assumed.

RAN2 agreed that an eNB can configure a RRC CONNECTED UE, capable of Rel-13 LWI and/or Rel-13 LWA, with certain WLAN measurement report triggering (via dedicated signaling alike any other regular LTE RRM measurements). The UE reports the fulfilment of the configured measurement events according to the configured WLAN thresholds. At least the following Rel-12 metrics are agreed for reporting: Wi-Fi Beacon Received Signal Strength Indicator (BeaconRSSI), Basic Service Set (BSS) load, WAN metrics.

Wi-Fi BeaconRSSI is an IEEE-defined measurement of the received signal strength of the received beacon frames. The decision on determining when and how to measure RSSI, e.g. which time-averaging function to apply over the recent history is typically left to the chipset manufacturers to decide. BeaconRSSI's definition and requirements will not be altered by 3GPP, except for its mapping to dBm and possibly absolute accuracy.

| BeaconRSSI | Integer | −100 to −40 | The received signal strength in dBm of Beacon frames on the channel. This may be time-averaged over recent history by a vendor-specific smoothing function. |
|---|---|---|---|

IEEE defines two types of scanning for network discovery in the neighborhood on various channels according to a STA's capability. The first type is active scanning which requires actively sending Probe Requests. The second type is passive scanning which is limited to wait for beacons. Scanning different center frequencies is done one by one and all in-scope channels are scanned.

Technical Specification (TS) 36.331 covers how a UE should perform measurements and reporting. TS 36.331 defines speed dependent scaling of time-o-Trigger which determines the time period during which a measurement condition needs to be fulfilled before triggering a measurement report. This allows the UE to perform measurements regularly when in different mobility states (determined based on Mobility State Estimate (MSE)), and to apply a time-to-Trigger parameter differently according to the UE state. For example, the time-to-Trigger parameter may be longer or shorter based for different mobility states. Using longer or shorter values for the time-to-Trigger parameter based on the mobility state of the UE optimizes mobility performance. For example, Radio Link Failure (RLF) may be avoided if it is detected early that the UE is moving fast away from a macro cell.

TS 36.133 covers measurements requirements. For example, TS 36.133 covers how measurements are sampled; how fast a cell which meets the cell reselection or event triggering criteria should be detected; and how often (at least) the UE should run measurements for Inter-RAT cells.

Various Power Saving Modes (PSMs) are defined in the 802.11 specification for power management. For example, some PSMs are described in the following article: *A guide to Wi-Fi power-save technologies* (May 13, 2010) by Craig Mathias, Farpoint Group (http://www.techworld.com/mobile/a-guide-to-wi-fi-power-save-technologies-4103/), last visited Sep. 21, 2015). However, all of these methods apply only to a Wi-Fi STA/UE which is already connected to an AP and which may or may not have data traffic to transmit/receive. For the case when the Wi-Fi device (e.g. STA/UE) is powered on but is not connected to an access point the device typically periodically scans for preferred networks to connect to. For example, the device may not be connected to an access point because no preferred access point is within range.

Embodiments of the invention described herein allow, for example, UE autonomous measurement related actions after the reception of WLAN Measurement Configuration (MeasConfig) from a network and upon fulfilment of certain events (implicit triggers). The WLAN measurements that are run according to the MeasConfig received by the UE, are measurements that the eNB has requested that the UE run (as agreed for Rel-13 LWA/LWI). Based on the UE reports, the eNB could for instance ask the UE for doing an AP change in case eNB-controlled WLAN mobility is used. However, this could be extended to other use cases as well.

Figure 2:
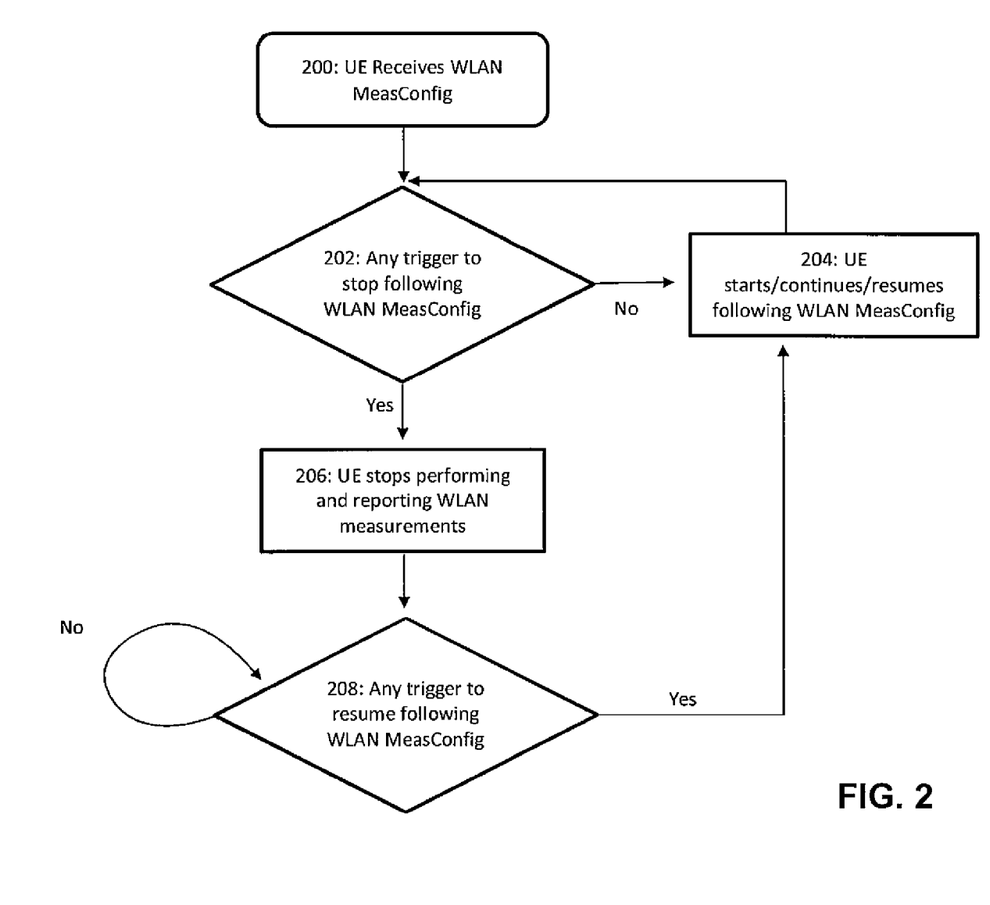
FIG. 2 shows an overview of UE autonomous measurement related actions upon implicit triggers according to embodiments of the invention.

FIG. 2, provides an overview of UE autonomous measurement related actions upon implicit triggers according to embodiments of the invention. At step 200, a UE receives MeasConfig. MeasConfig configures the UE to periodically measure preferred WLAN APs to connect to. At step 202, certain events may be detected by the UE. For example, in Rel-13 LWAILWI the events may be "no WLAN detected" or "UE stationarity detected". If no event is detected then, at step 204, the UE continues to follow the periodic measurements which were indicated to the UE by the MeasConfig. If an event is detected at step 202, then at step 204 the UE stops following the WLAN MeasConfig in response to the detected event. For example, the UE action may be "UE autonomously disables WLAN Measurement Configuration" for battery saving purposes. According to some embodiments of the invention, at step 208, the UE may continue to disable measurements and reporting of the WLAN measurements until some subsequent event occurs. For example, the subsequent event may be: the expiry of a certain validity timer; the UE may change from stationary to non-stationary (e.g. "UE non-stationarity detected"); and/or anew UE action may be applied (e.g. "UE autonomously re-activates WLAN Measurement Configuration"). If a subsequent event is detected then the process returns to step 204 to resume following the periodic measurements which were indicated by the MeasConfig that the UE received in step 200.

The trigger "no WLAN detected" may mean that no WLAN ID/AP/channel is detected at all, or that one or more WLAN IDs/APs/channels within the RAN provided set is not detected. The UE action "UE autonomously disables WLAN Measurement Configuration" means that the UE does not follow the measurement configuration for any of the WLAN IDs/APs/channels which meet the "no WLAN detected" trigger. That is, during the time period when MeasConfig is autonomously disabled, the UE would not perform any of the WLAN measurements related to the non-detected WLAN ID/AP/channel for the purpose of the WLAN MeasConfig.

Figure 3:
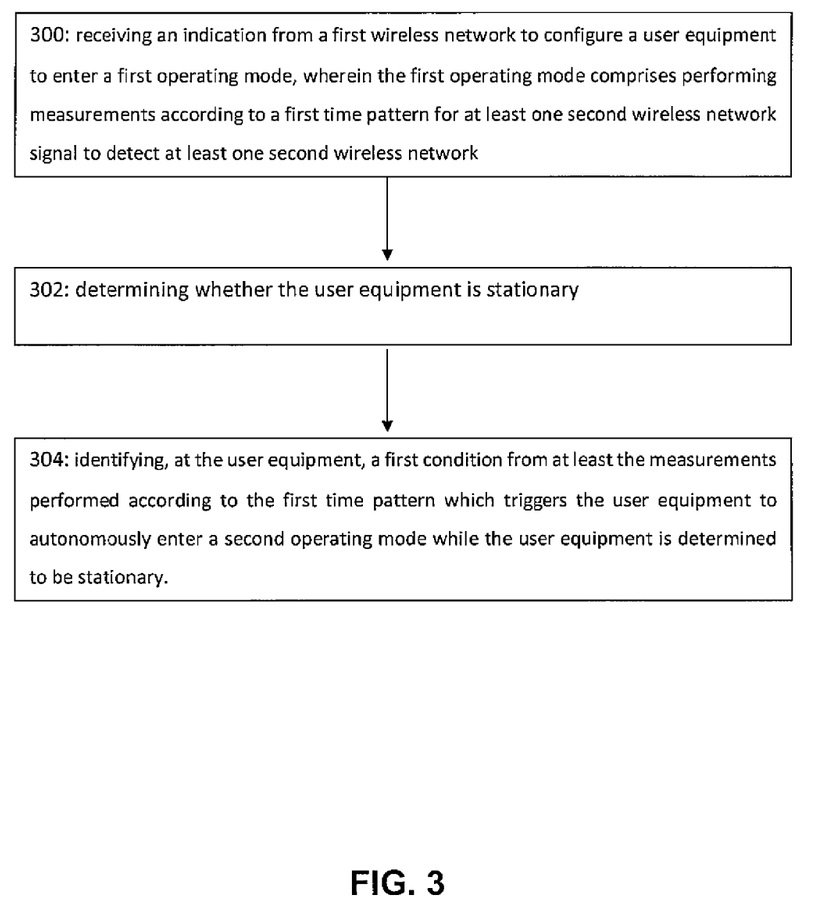
FIG. 3 is a logic flow diagram for autonomous measurement related actions upon implicit triggers, and illustrates the operation of an exemplary method, a result of execution of computer program instructions embodied on a computer readable memory, functions performed by logic implemented in hardware, and/or interconnected means for performing functions in accordance with exemplary embodiments.

FIG. 3 is a logic flow diagram for performing autonomous measurement related actions based upon implicit triggers. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, the Autonomous Measurement module 140 may include multiples ones of the blocks in FIG. 3, where each included block is an interconnected means for performing the function in the block. The blocks in FIG. 3 are assumed to be performed by the UE 110, e.g., under control of the Autonomous Measurement module 140 at least in part.

According to the embodiment depicted in FIG. 3, at block 300 the UE receives an indication from a first network which configures the UE to enter a first operating mode. The indication may be, for example, MeasConfig. The first operating mode may comprise the user equipment performing measurements according to a first time pattern for at least one second wireless network signal to detect at least one second wireless network. A time pattern may comprise running periodic measurements with a given periodic interval. Performing measurements may include scanning for radio channels/signals. The first wireless network may be, for example, a cellular wireless network, and the at least one second wireless network may be, for example, WLANs. The second network signals that may be measured may include, for example, SSID/AP/channels of a WLAN. According to one embodiment, the measurements may comprise measuring a signal quality of at least one second wireless network signal. For example, the signal quality measurement may be a received signal strength indicator (RSSI) measurement.

At block 302, the user equipment determines whether the user equipment is stationary. According to a certain embodiment, for example, the determination of stationarity or non-stationarity may be determined by at least one of: an estimate based on measurements of WLAN signal quality (e.g. Wi-Fi beacon RSSI); measurements in other RATs/layers and neighbor-cell measurements; mobility state estimate (MSE). Measurements in other RATs/layers may include, for example, LTE EUTRAN (e.g. LTE), UTRAN (e.g. HSPA Ee/No, RSCP), GERAN/2G, or 5G measurements. Basing this estimation only on the Wi-Fi beacon RSSI value may lead to inaccuracy. For example, even when a device is kept at the same position, the RSSI is not always stable and may fluctuate. The reliability may be improved in some cases by also considering neighbor cell measurements. If the neighbor cell measurements do not vary significantly, then there is a good indication that the UE is stationary. For example, in LTE a user equipment may measure intra-frequency neighbors rather regularly for mobility and performance purposes (intra-frequency neighbors cause interference). In LTE, there is no need to indicate intra-frequency neighboring cell in the serving cell system information to enable the UE to search and measure a cell i.e. E-UTRAN relies on the UE to detect the neighboring cells. In TS 36.300, section 10.1.3 "Intra-frequency neighbour (cell) measurements", neighbor cell measurements performed by the UE are intra-frequency measurements when the current and target cell operate on the same carrier frequency. Similarly functionality is also applicable, for example, to UTRAN measurements, in this case the list of neighbor to measure are provided by the network.

At step 304, a first condition is identified from at least the performed measurements which triggers the UE to autonomously enter a second operating mode while the user equipment is determined to be stationary. According to one example embodiment, the first condition comprises identifying that no second networks are detected from the performed measurements; and the second operating mode comprises preventing the user equipment from performing the measurements according to the first time pattern. In an alternative embodiment, the first condition comprises detecting at least one WLAN from the measurements, and the second operation mode comprises preventing the user equipment from preforming the measurements according to the first time pattern for any further WLAN signals except the detected at least one WLAN.

In another embodiment, the operations may further comprise the user equipment receiving a configuration message from the eNB, wherein the message comprises an indication that the user equipment is allowed to operate in the second operating mode and a timer. When the timer expires, the user equipment checks with the network, for example by sending a request to the network for indication as to whether the user equipment is still allowed to operate in the second operating mode. For example, the message may instruct the UE that it is allowed to "operate on its own" in terms of aggressive power saving features. Optionally, the first indication from the network received at block 300 indicates how the UE should behave during the expiration of the timer and afterwards. For example, the indication may instruct the UE to "operate on your own during the timer" and then return to apply the first time pattern. Additional messages may still be exchanged between the UE and the network to trigger the change of operational mode in the UE.

Alternatively, the UE may not receive explicit instruction from the network, e.g. eNB. The UE may not receive an explicit indication of the triggers for pausing the measurements. For example, the UE may indicate that "WLAN measurements are paused" in a measurement report (e.g. a WLAN measurement report or LTE measurement report) and the eNB may remotely trigger the user equipment to enable WLAN monitoring (e.g. through RRC configuration). The UE may further include information in the measurement report as to why the WLAN measurements are paused, for example stationarity.

According to another embodiment, the second operating mode comprises performing measurements according to a different time pattern. This second time pattern may be longer than the first time pattern. For example, the UE may periodically perform measurements during periods when stationarity is met in order to test for new networks (e.g. WLAN APs) popping up in the environment, i.e. "exploring measurements". The measurement interval of the second time pattern to run these "exploring measurements" can be long and not in the typical range of 50-100 ms. For example, the intervals may be in the range of several seconds or even minutes. For example in WLAN, WLAN frequency channel reselection by a WLAN AP does not occur that quickly. A WLAN AP which determines the opportunity/need to change the WLAN frequency channel requires a collecting measurements from neighbor APs. These measurements can be collected by scanning from the neighbor AP beacons which are not transmitted that frequently, e.g. every 100 ms. Even in the best case a reselection will take at least seconds, so these longer intervals are still sufficient because a new AP is not likely to show up quickly. Optionally, the second periodic interval may be scaled according to a mobility state estimate (MSE) of the user equipment.

In another embodiment the decisions on whether to enter the second operating mode and whether to stay in the second operating mode are left entirely up to UE, without any indication from the network.

The following are examples of possible implementations. Example 1: receiving an indication from a first wireless network to configure a user equipment to enter a first operating mode, wherein the first operating mode comprises performing measurements according to a first time pattern for at least one second wireless network signal to detect at least one second wireless network; determining whether the user equipment is stationary; and identifying, at the user equipment, a first condition from at least the measurements performed according to the first time pattern which triggers the user equipment to autonomously enter a second operating mode while the user equipment is determined to be stationary.

Example 2

The method according to Example 1, wherein the first condition comprises identifying that no second wireless network is detected; and wherein the second operating mode further comprises preventing the user equipment from performing any further measurements according to the first time pattern.

Example 3

The method according to Example 1, wherein the first condition comprises detecting at least one second wireless network; and wherein the second operating mode comprises preventing the user equipment from performing any further measurements according to the first time pattern, except for wireless network signals of the detected at least one second wireless network.

Example 4

The method according to Example 1, wherein the second operating mode comprises performing measurements according to a second time pattern for at least one additional second wireless network signal to detect at least one additional second wireless network, wherein the second time pattern comprises measurements intervals that are longer than measurement intervals of the first time pattern.

Example 5

The method according to Example 4, wherein performing the measurements according to the second time pattern is scaled according to a mobility state estimate (MSE) of the user equipment

Example 6

The method according to Example 1, further comprising: determining that the user equipment is non-stationary when the user equipment is in the second operating mode; and returning the user equipment to the first operating mode to resume preforming the measurements according to the first time pattern.

Example 7

The method according to Example 1, receiving another indication from the first wireless network when the user equipment is in the second operating mode which triggers the user equipment to return to the first operating mode to resume performing measurements according to the first time pattern.

Example 8

The method according to Example 1, further comprising, receiving a message comprising an indication that the user equipment is allowed to operate in the second operating mode and a timer; and on expiry of the timer, checking with the first network to determine whether the user equipment is still allowed to operate in the second operating mode.

Example 9

The method according to Example 1, wherein determining whether the user equipment is stationary is based on at least one of: a signal quality of the second wireless network signal; a signal quality of at least one other radio access technology; a signal quality of at least one neighboring eNB; and a mobility state estimate (MSE).

Example 10

The method according to Example 1, wherein performing the measurements comprises measuring a signal level and/or signal quality of the at least one second wireless network signal, and reporting the signal quality to the first network.

Example 11

The method according to Example 1, wherein the first wireless network is a cellular wireless network, and the at least one second wireless network is a wireless local area network (WLAN).

Example 12

The method of Example 1, wherein the indication is received while the user equipment is in an RRC-Connected mode.

A further example is an apparatus that includes one or more processors and one or more memories including computer program code. The one or more memories and the computer program code are configured to, with the one or more processors, cause the apparatus to perform the methods in any one of examples 1-12.

Another example embodiment is a computer program product comprising a non-transitory computer-readable medium bearing computer program code embodied therein for use with a computer, the computer program code comprising: code for performing the steps of Examples 1-12.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The advantages of some embodiments of the invention include: UE power saving and predictable UE behavior. Also, the embodiments of the invention avoids or minimizes interruptions in the data between the AP and the UE if ongoing data transmission to/from the WLAN AP is taking place (as no transmission can take place in parallel to WLAN measurements). That is, useless scanning for other beacons (e.g. passive scanning may take –100 ms per channel although not all channels have to be measured at the same time) is suspended autonomously by the UE if/when not the measurements are not needed.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

Although embodiments of the invention have been described LWAILWI, the same solution can be applied also to LAA measurements or inter-RAT measurement (e.g. 50 measurements) or also to the measurements applicable to the same/different network layer within the same RAT.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

If desired, the different functions discussed herein may be performed in a different order and/or concurrently with each other. Furthermore, if desired, one or more of the above-described functions may be optional or may be combined.

The invention claimed is:

1. A method comprising:
receiving, by a user equipment, an indication from a first wireless network to enter a first operating mode, the first operating mode including performing measurements for at least one second wireless network signal according to a first time pattern to detect at least one second wireless network;
determining, by the user equipment, whether the user equipment itself is stationary; and
identifying, at the user equipment, a first condition from at least the measurements performed according to the first time pattern, said first condition triggering the user equipment to enter a second operating mode autonomously while the user equipment determines itself to be stationary,
wherein the first condition comprises identifying that no second wireless network is detected, and
wherein the second operating mode comprises stopping performing any further measurements according to the first time pattern.

2. The method according to claim 1, wherein the first condition comprises detecting at least one second wireless network; and wherein the second operating mode comprises stopping performing any further measurements according to the first time pattern, except measurements for wireless network signals of the detected at least one second wireless network.

3. The method according to claim 1, wherein the second operating mode comprises performing measurements for at least one additional second wireless network signal according to a second time pattern to detect at least one additional second wireless network, wherein the second time pattern comprises longer measurement intervals than measurement intervals of the first time pattern.

4. The method according to claim 3, wherein performing the measurements according to the second time pattern is scaled according to a mobility state estimate of the user equipment.

5. The method according to claim 1, further comprising:
determining, by the user equipment, that the user equipment itself is non-stationary when the user equipment is in the second operating mode; and
returning the user equipment to the first operating mode to resume preforming the measurements according to the first time pattern.

6. The method according to claim 1, further comprising:
receiving, by the user equipment, another indication from the first wireless network when the user equipment is in the second operating mode, said another indication triggering the user equipment to return to the first operating mode to resume performing measurements according to the first time pattern.

7. The method according to claim 1, further comprising:
receiving a message including an indication that the user equipment is allowed to operate in the second operating mode and including a timer; and
on expiry of the timer, checking with the first wireless network to determine whether the user equipment is still allowed to operate in the second operating mode.

8. The method according to claim 1, wherein determining, by the user equipment, whether the user equipment is stationary is based on at least one of:
a signal quality of the second wireless network signal;
a signal quality of at least one other radio access technology;
a signal quality of at least one neighboring eNB; and
a mobility state estimate.

9. The method according to claim 1, wherein performing measurements for at least one second wireless network signal comprises measuring a signal level and/or signal quality of the at least one second wireless network signal, and reporting the signal level and/or signal quality to the first wireless network.

10. The method according to claim 1, wherein the first wireless network is a cellular wireless network, and the at least one second wireless network is a wireless local area network.

11. The method according to claim 1, wherein the indication is received by the user equipment when the user equipment is in an RRC-Connected mode.

12. An apparatus comprising:
at least one processor; and
at least one non-transitory memory including computer program code, the at least one memory and the computer program code configured, with the at least one processor, to cause the apparatus to perform at least the following:
receive an indication from a first wireless network to enter a first operating mode, the first operating mode including performing measurements for at least one second wireless network signal according to a first time pattern to detect at least one second wireless network;
determine whether the apparatus itself is stationary; and
identify a first condition from at least the measurements performed according to the first time pattern, said first condition triggering the apparatus to enter a second operating mode autonomously while the apparatus determines itself to be stationary,
wherein the first condition comprises identifying that no second wireless network is detected, and
wherein the second operating mode comprises stopping performing any further measurements according to the first time pattern.

13. The apparatus according to claim 12, wherein the first condition comprises detecting at least one second wireless network; and wherein the second operating mode comprises stopping performing any further measurements according to the first time pattern, except measurements for wireless network signals of the detected at least one second wireless network.

14. The apparatus according to claim 12, wherein the second operating mode comprises performing measurements for at least one additional second wireless network signal according to a second time pattern to detect at least one additional second wireless network, wherein the second time pattern comprises longer measurement intervals than measurement intervals of the first time pattern.

15. The apparatus according to claim 14, wherein performing the measurements according to the second time pattern is scaled according to a mobility state estimate of the apparatus.

16. The apparatus according to claim 12, wherein the at least one memory and the computer program code are further configured, with the at least one processor, to cause the apparatus to:
- determine that the apparatus itself is non-stationary when the apparatus is in the second operating mode; and
- return the apparatus to the first operating mode to resume preforming the measurements according to the first time pattern.

17. The apparatus according to claim 12, wherein the at least one memory and the computer program code are further configured, with the at least one processor, to cause the apparatus to:
- receive another indication from the first wireless network when the apparatus is in the second operating mode, said another indication triggering the apparatus to return to the first operating mode to resume performing measurements according to the first time pattern.

18. A computer program product comprising a non-transitory computer-readable medium bearing computer program code embodied therein for use with a computer, the computer program code comprising code for causing a user equipment to perform at least the following:
- receiving, by the user equipment, an indication from a first wireless network to enter a first operating mode, the first operating mode including performing measurements for at least one second wireless network signal according to a first time pattern to detect at least one second wireless network;
- determining, by the user equipment, whether the user equipment itself is stationary; and
- identifying, at the user equipment, a first condition from at least the measurements performed according to the first time pattern, said first condition triggering the user equipment to enter a second operating mode autonomously while the user equipment determines itself to be stationary,
- wherein the first condition comprises identifying that no second wireless network is detected, and
- wherein the second operating mode comprises stopping performing any further measurements according to the first time pattern.

* * * * *